United States Patent
Natoli (10) Patent No.: US 12,407,636 B2
(45) Date of Patent: Sep. 2, 2025

(54) TRANSFORMING A MESSAGE OF A FIRST CHANNEL TO A MESSAGE OF A SECOND CHANNEL

(71) Applicant: Klaviyo, Inc, Boston, MA (US)

(72) Inventor: Charles T. Natoli, San Francisco, CA (US)

(73) Assignee: Klaviyo, Inc, Boston, MA (US)

( * ) Notice: Subject to any disclaimer, the term of this patent is extended or adjusted under 35 U.S.C. 154(b) by 50 days.

(21) Appl. No.: 18/410,508

(22) Filed: Jan. 11, 2024

(65) Prior Publication Data

US 2025/0233837 A1    Jul. 17, 2025

(51) Int. Cl.
| | |
|---|---|
| G06F 15/16 | (2006.01) |
| H04L 51/066 | (2022.01) |
| H04L 51/10 | (2022.01) |
| H04L 51/21 | (2022.01) |
| G06F 40/58 | (2020.01) |

(52) U.S. Cl.
CPC ............ H04L 51/066 (2013.01); H04L 51/10 (2013.01); H04L 51/21 (2022.05); *G06F 40/58* (2020.01)

(58) Field of Classification Search
CPC ....... H04L 51/066; H04L 51/21; H04L 51/10; G06F 40/58
USPC .......................................................... 709/206
See application file for complete search history.

(56) References Cited

U.S. PATENT DOCUMENTS

| | | | |
|---|---|---|---|
| 6,424,997 B1 | 7/2002 | Buskirk | |
| 6,430,624 B1 * | 8/2002 | Jamtgaard | G06F 16/957 707/E17.119 |
| 6,493,751 B1 * | 12/2002 | Tate | H04L 41/0843 370/254 |
| 6,871,236 B2 * | 3/2005 | Fishman | H04L 67/04 709/219 |
| 7,025,209 B2 * | 4/2006 | Hawkins | H04L 69/161 709/219 |
| 8,417,269 B1 * | 4/2013 | Lin | H04W 4/12 709/227 |
| 8,606,655 B2 | 12/2013 | Allen et al. | |
| 8,751,327 B2 | 6/2014 | Park et al. | |
| 9,300,609 B1 * | 3/2016 | Beausoleil | H04L 63/08 |
| 9,338,613 B2 * | 5/2016 | Lin | H04W 4/12 |
| 10,078,854 B1 | 9/2018 | Minks-Brown | |
| 11,144,980 B2 | 10/2021 | Fredrich et al. | |
| 11,769,138 B2 * | 9/2023 | Sierra | G06Q 30/0279 705/342 |
| 11,909,699 B1 * | 2/2024 | Natoli | H04L 51/02 |

(Continued)

*Primary Examiner* — Alicia Baturay (74) *Attorney, Agent, or Firm* — Brian Short (57) ABSTRACT

Apparatuses, methods, and systems for transforming a message of a first channel to a message of a second channel. One method includes receiving, by a server, a first channel electronic message, wherein the first channel electronic message includes a formatted message that includes at least text, extracting and prioritizing the at least text of the formatted message of the first channel electronic message, including converting the at least text of the formatted message of the first channel electronic message into machine-encoded text, and prioritizing text of the machine-encoded text based on at least a size and placement of the text of the formatted message. The method further includes drafting, by the server, a set of second channel electronic messages based on the prioritized text, and electronically sending the set of second channel electronic messages to recipients.

16 Claims, 5 Drawing Sheets

(56) References Cited

U.S. PATENT DOCUMENTS

| | | |
|---|---|---|
| 11,936,808 B2 | 3/2024 | McCann |
| 2004/0150518 A1 | 8/2004 | Phillips et al. |
| 2006/0031337 A1* | 2/2006 | Kim .................. H04L 51/214 |
| | | 709/206 |
| 2007/0260519 A1 | 11/2007 | Sattley et al. |
| 2008/0307010 A1 | 12/2008 | Cullison et al. |
| 2009/0037253 A1 | 2/2009 | Davidow et al. |
| 2009/0199229 A1 | 8/2009 | Gupta et al. |
| 2013/0226691 A1 | 8/2013 | Chatow et al. |
| 2014/0074595 A1 | 3/2014 | Chomsky et al. |
| 2014/0120864 A1 | 5/2014 | Manolarakis et al. |
| 2014/0372227 A1 | 12/2014 | Gausebeck et al. |
| 2015/0106173 A1 | 4/2015 | O'Donnell et al. |
| 2016/0241502 A1 | 8/2016 | Georgiou |
| 2016/0253704 A1 | 9/2016 | Snyder et al. |
| 2017/0017622 A1 | 1/2017 | Soundararajan et al. |
| 2017/0124447 A1 | 5/2017 | Chang et al. |
| 2018/0165723 A1 | 6/2018 | Wright et al. |
| 2019/0043106 A1 | 2/2019 | Talmor et al. |
| 2019/0303378 A1 | 10/2019 | Angle et al. |
| 2019/0373337 A1 | 12/2019 | Martell et al. |
| 2020/0013092 A1 | 1/2020 | Liu et al. |
| 2021/0328965 A1 | 10/2021 | Gorny |
| 2023/0385307 A1 | 11/2023 | White |
| 2024/0394744 A1 | 11/2024 | Dhingra et al. |
| 2024/0394752 A1 | 11/2024 | Dhingra et al. |

\* cited by examiner

FIG. 1

Original email including image with text
210

Unimportant small text at the top

MEN | WOMEN | SALE

BIG TEXT: SALE ENDS FRIDAY

SUMMER IS HERE

BUY DRESSES

20% off all dresses
Plus 35% off clearance styles.
More details here

Other irrelevant section below (skipped by model)

Receiving, by a server, a first channel electronic message, wherein the first channel electronic message includes a formatted message that includes at least text
510

Extracting and prioritizing the at least text of the formatted message of the first channel electronic message
520

Converting the at least text of the formatted message of the first channel electronic message into machine-encoded text
530

Prioritizing text of the machine-encoded text based on at least a size and placement of the text of the formatted message
540

Drafting, by the server, a set of second channel electronic messages based on the prioritized text
550

Electronically sending the set of second channel messages to recipients
560

*FIG. 5*

TRANSFORMING A MESSAGE OF A FIRST CHANNEL TO A MESSAGE OF A SECOND CHANNEL

FIELD OF THE DESCRIBED EMBODIMENTS

The described embodiments relate generally to intelligent electronic message management. More particularly, the described embodiments relate to systems, methods, and apparatuses for transforming a message of a first channel to a message of a second channel.

BACKGROUND

Merchants frequently send electronic messages to current and prospective customers to generate sales of products or services. The content of the electronic messages can influence the success of the electronic messages.

It is desirable to have methods, apparatuses, and systems for transforming an electronic message of a first channel to a message of an electronic message of a second channel.

SUMMARY

An embodiment includes a computer-implemented method for transforming a message of a first channel to a message of a second channel, including receiving, by a server, a first channel electronic message, wherein the first channel electronic message includes a formatted message that includes at least text, extracting and prioritizing the at least text of the formatted message of the first channel electronic message, including converting the at least text of the formatted message of the first channel electronic message into machine-encoded text, and prioritizing text of the machine-encoded text based on at least a size and placement of the text of the formatted message. The method further includes drafting, by the server, a set of second channel electronic messages based on the prioritized text, and electronically sending the set of second channel electronic messages to recipients.

Another embodiment includes a system for transforming a message of a first channel to a message of a second channel. The system includes a user server and a server electronically connected to the user server through a network. The server is configured to receive a first channel electronic message, wherein the first channel electronic message includes an image that includes at least text, extract and prioritize the at least text of the image of the first channel electronic message, including converting the at least text of the image of the first channel electronic message into machine-encoded text, and prioritizing text of the machine-encoded text based on at least a size and placement of the text of the image. The server is further configured to draft a set of second channel electronic messages based on the prioritized text, and electronically send the set of second channel electronic messages to recipients.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for transforming an electronic message of a first channel to an electronic message of a second channel. Generating improved messages saves time for a merchant generating electronic marketing messages. Additionally, improved messages result in better performance (which can be measured by sensed actions of recipients of the improved second channel messages) of the electronic marketing messages. For an embodiment, the electronic marketing messages are included within an electronic campaign of the merchant that may include many electronic marketing messages. For at least some other embodiments, the electronic marketing messages are generated to be sent in response to some action, such as, an abandoned shopping cart notification, a new subscriber (customer) welcome, and/or a one-time message send. At least some embodiments include tuning or adjusting parameters of the messages of the second channel including at least one of adjusting priorities of components (size, location) of the text of the messages of the second channel, adjusting send times of the messages of the second channel, and/or adjusting a list of recipients that receive the messages of the second channel. For an embodiment, the parameters of the messages of the second channel are adjusted based on sensing an action of recipients of the messages of the second channel. For an embodiment, the parameters of the messages of the second channel are adjusted based on sensing of an action a user (manager) of the messages of the second channel.

The described embodiments solve practical problems associated with a user (merchant or marketer) sending a common (the same) message through multiple types of electronic messaging. For example, a user may want to send the same message (for example, announcing a sale or new product) via multiple different electronic channels. Two popular electronic channels include email and SMS (Short Message Service). However, the characteristics of the different electronic channels can be very different. A message generated as an email may not be easily converted to an SMS message. At least some embodiments provide a technical solution to the problem of transforming a first channel electronic message into a second channel electronic message. At least some of the described embodiments automatically rewrite a message of the first channel into a message of a second channel.

Figure 1:
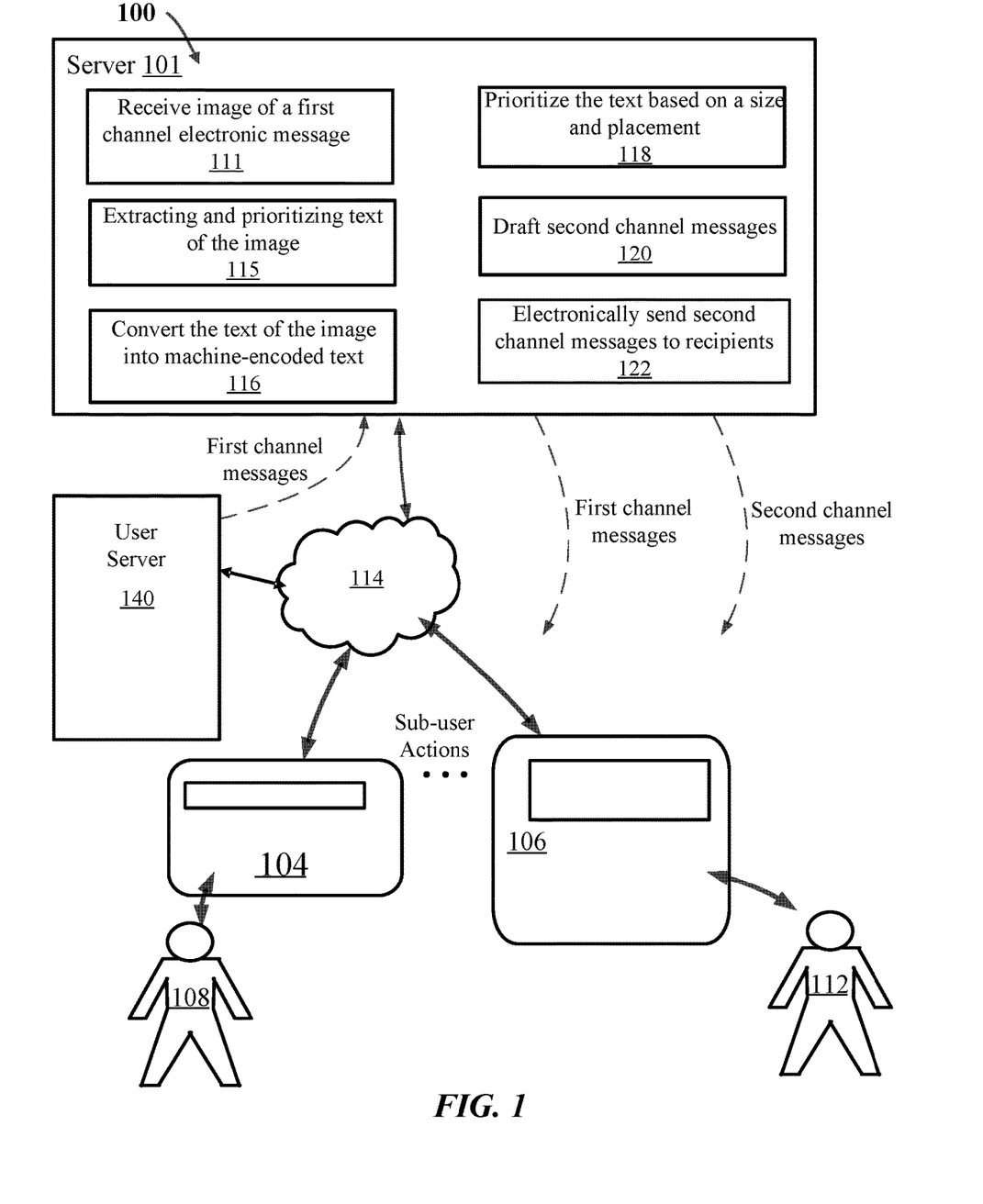
FIG. 1 shows a system for transforming a message of a first channel to a message of a second channel, according to an embodiment.

FIG. 1 shows a system for transforming a message of a first channel to a message of a second channel, according to an embodiment. The system 100 includes a server 101 that is connected through an electronic network 114 to at least a user server 140 of a user. For an embodiment, the user server 140 manages a merchant website of the user. It is to be understood that the term "merchant" is being used liberally. That is, a merchant includes any type of business owner. For example, a merchant can include, for example, a teacher, a doctor, a restaurant owner, etc. Further, it is to be understood that at least some embodiments for transforming the message of a first channel to a message of a second channel are implemented at the server 101 which is accessed by the merchant on a client side of the server 101. Specifically, for an embodiment, transforming the message of a first channel to the message of a second channel is performed by a UI (user interface) of the server 101. For an embodiment, a user or merchant provides control to the server 101 through the user server 140.

For an embodiment, the server 101 receives 111 from the user server 140 a first channel electronic message, wherein the first channel electronic message includes a formatted message that includes at least text. For an embodiment, the at least text of the formatted message of the first channel electronic message is extracted and prioritized, including converting the at least text of the formatted message of the first channel electronic message into machine-encoded text.

For an embodiment, the server 101 receives 111 from the user server 140 the first channel electronic message, wherein the first channel electronic message includes an image that includes at least text. The image can include figures, drawings, pictures, etc., but further includes at least some text embedded into the image. For an embodiment, the test of the image is not computer readable. For an embodiment, the first channel electronic message is an email which is to be converted to an SMS (short message service) message. For an embodiment, the server 101 further operates to extract and prioritize 115 the at least text of the image of the first channel electronic message. That is, the text of the image is extracted from the image. The extracted text is then prioritized based on, for example, the position or location of the text within the image.

For an embodiment, the server 101 operates to extract and prioritize 115 by converting 116 the at least text of the image of the first channel electronic message into machine-encoded text, and then prioritizing 118 the text of the machine-encoded text based on at least a size and placement of the text of the image. For an embodiment, converting the image of the first channel electronic message includes applying optical character recognition (OCR) to the image. OCR is a technology that recognizes text within a digital image. OCR may be used to recognize text in scanned documents and images. OCR software can be used to convert a physical paper document, or an image into an accessible electronic version with text.

For an embodiment, an HTML parser library is used to extract the text. Further, for an embodiment, the HTML parser library further operates to extract text size and location. For an embodiment, an OCR algorithm is configured to determine coordinates of a box that includes the text.

For an embodiment, the server 101 further operates to draft 120 a set of second channel electronic messages based on the prioritized text. For an embodiment, the extracted text is entered into a text generation model which generates one or more second channel electronic messages. Further, for an embodiment, the text generation model is directed to follow marketing best practices like being concise, friendly, having a clear call to action, etc. For an embodiment, the sensed sub-user (recipient) actions and sensed user actions are tracked and used to train the text generation model. Further, examples of well-written messages are used to help guide (train) the text generation model to generate second channel messages that look better or are more effective.

For an embodiment, the server 101 further operates to electronically send 122 the set of second channel electronic messages to computing devices 104, 106 of sub-users 108, 112.

For at least some embodiments, the transformation of the message of the first channel to a message of the second channel includes the summarization of a visually (images included) laid out first channel electronic message (such as, an email) which does not merely use artificial intelligence to summarize the text of the first channel electronic message. For an embodiment, the text extraction from the image accounts for things like text size and visual position.

As previously stated, for an embodiment, the first channel electronic message is an email, and the second channel electronic message is an SMS text message. It is to be understood that emails can contain multiple topics while an SMS (or other short form channels) message needs to be more concise. At least some of the described embodiments include determining the content in the email, and determining what is the most important/relevant/actionable message to put in the SMS. This includes extracting and prioritizing the text extracted from the image of the first channel electronic message. Further, at least some embodiments include extracting and condensing the text extracted from the image of the first channel electronic message.

For an embodiment, the first channel electronic message includes a marketing email, and the text of an image of the marketing email is extracted and prioritized using text font size and text position in the image of the marketing email to identify what information is most important. At least some embodiments include extracting a single core topic of the email. That is, many emails include multiple topics, while the shorter length of an SMS may only fit one topic. An embodiment includes identifying key phrases from the email message to be used in the SMS message.

For at least some embodiments, converting 116 the at least text of the image of the first channel electronic message into machine-encoded text allows use of a visual layout of the email to identify which textual topics are the most important (as identified, for example, by which textual items are the largest and/or highest up in the email).

For at least some embodiments, textual topic of the text of the image of the first channel electronic message that may be identified includes an introductory catch phrase (usually the subject line of the email/preview text), key details about the promotion or product on offer (percent off, offer deadline, promo code, product details), and/or a call to action phrase that is most relevant to the message ("buy now", "click here", "shop our delicious salmon" etc.).

Figure 2:
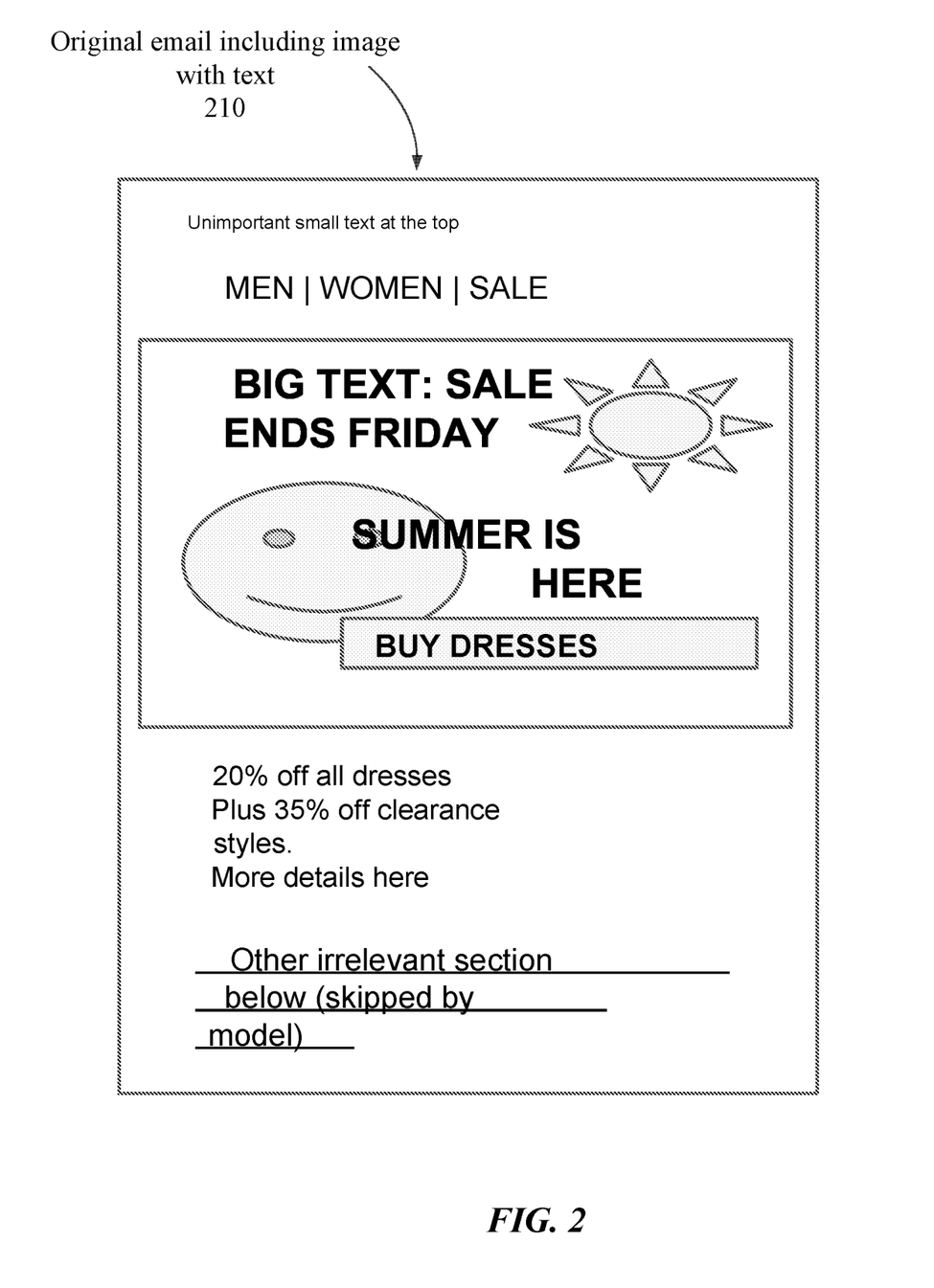
FIG. 2 shows a first channel electronic message including a formatted message that includes at least text, according to another embodiment.

FIG. 2 shows a first channel electronic message (which may be an email that includes an image with text) 210 including a formatted message that includes at least text, according to another embodiment. For an embodiment, the first channel electronic message includes an email message that includes an image. For an embodiment, the first channel electronic message cannot be sent as a second channel electronic message because the second channel electronic message does not support the sending of messages that include the image of the first channel electronic message. That is, the second channel electronic messages may be, for example, SMS messages that do not support the inclusion of images.

As shown, the exemplary image of the first channel electronic message includes text at various locations of the image, and the text includes varying sizes. As described, for at least some embodiments, the layout of the image includes information regarding the location and size of the text within the image. For an embodiment, an HTML parser library is used to extract the text. Further, for an embodiment, the HTML parser library further operates to extract text size and location. For an embodiment, an OCR algorithm is configured to determine coordinates of a box that includes the text. For an embodiment, converting the at least text of the formatted message of the first channel electronic message into machine-encoded text includes extracting text from the formatted message including size and formatting of the extracted text, extracting alt text from html image tags of the formatted message, and generating the machine-encoded text from the extracted text and the alt text.

Figure 3:
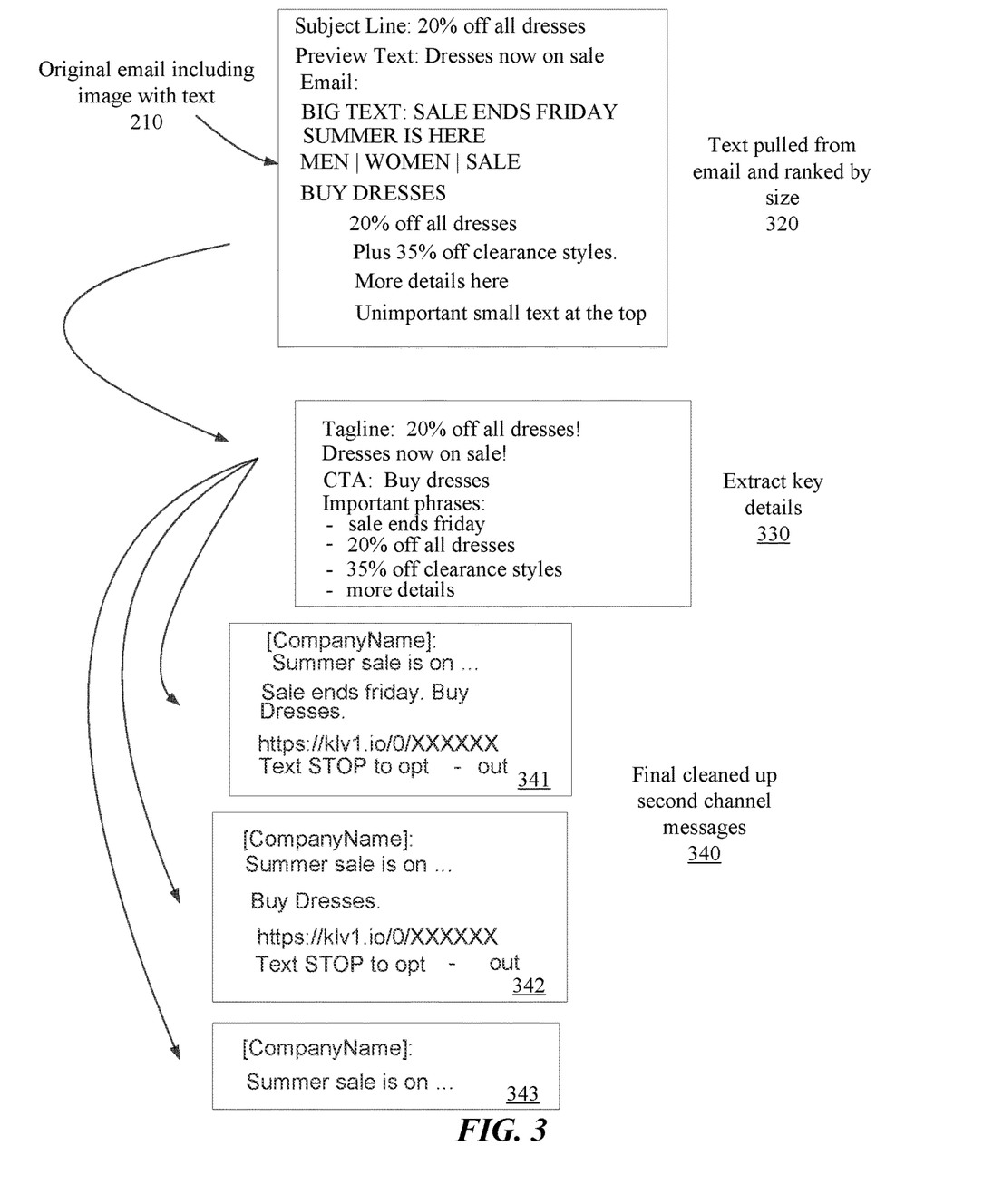
FIG. 3 shows a process of transforming a first channel electronic message to a second channel electronic message, according to another embodiment.

FIG. 3 shows a process of transforming a first channel electronic message to a second channel electronic message, according to another embodiment. The original message 210 (as shown in FIG. 2) that includes the image is converted into machine-encoded text. A step 320 includes pulling machine-encoded text from the second channel electronic message and ranking the text by the size of the text. For example, the text "SALE ENDS FRIDAY" is larger than the text "BUY DRESSES". Therefore, for an embodiment, the text "SALE ENDS FRIDAY" is ranked higher than the text "BUY DRESSES". Further, the text may be ranked by the location of the text within the image of the first channel electronic message. A step 330 includes extracting key details of the text pulled from the original message.

A step 340 includes cleaning up the second channel electronic messages including prioritizing and condensing the machine-encoded text. Once prioritized and ranked the text is used to create different possible second channel electronic messages. FIG. 3 shows several different types of second channel messages 341, 342, 343. For an embodiment, the different types of second channel messages 341, 342, 343 can be provided to the user of the user server 140 as a variety of options that the user can select. For an embodiment, the different types of second channel messages 341, 342, 343 include a mix of longer and shorter messages. The shorter messages (less than a threshold number of characters) are less expensive for the user (merchant) to send, whereas the longer messages (greater than a threshold number of characters) can be more creative.

As will be described, an embodiment includes managing, by the server, the set of second channel electronic messages by fine tuning the second channel electronic messages based on sensing actions of a user in response to the second channel electronic messages. Here, the actions of the user (merchant) based on reviewing the different types of second channel messages 341, 342, 343 can be used to identify (tune) which of the different types of second channel messages 341, 342, 343 are sent to recipients.

Figure 4:
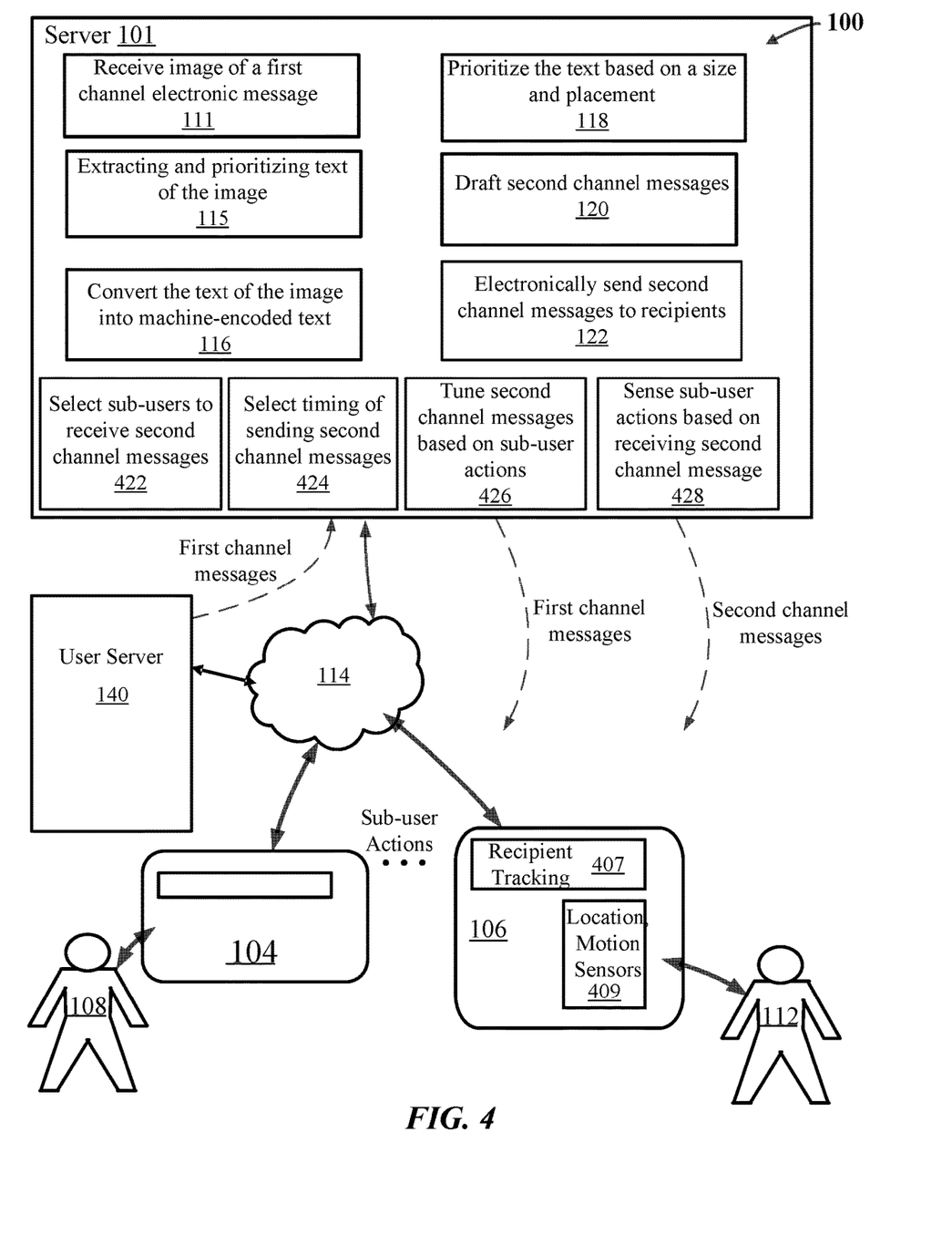
FIG. 4 shows a system for transforming a message of a first channel to a message of a second channel, according to another embodiment.

FIG. 4 shows a system for transforming a message of a first channel to a message of a second channel, according to another embodiment. An embodiment further includes adaptively selecting 422 sub-users (such as, sub-users 108, 112 of computing devices 104, 106) to receive the second channel electronic messages. An embodiment further includes adaptively selecting a timing of electronically sending the second channel electronic messages. An embodiment further includes tuning the prioritizing and drafting of the second channel electronic messages.

Selecting Sub-Users to Receive Second Channel Electronic Messages

As described, at least some embodiments include selecting 422 which sub-users are to receive the second channel electronic messages. For an embodiment, the sub-users are selected based on the type of computing device associated with the sub-user. Further, as described, for an embodiment, sub-users are adaptively selected to receive the second channel messages based on monitoring, sensing, or tracking of response of recipients (sub-users) of the second channel messages. For an embodiment, sub-users are adaptively selected to receive the second channel messages or the first channel messages based on monitoring, sensing, or tracking of response of recipients (sub-users) of the second channel messages. That is, some recipients (sub-users) are more likely to perform an action based on either receiving the first channel messages or the second channel messages. For an embodiment, the sensing of the actions of the recipients is used to adaptively select which of the first channel or second channel messages to electronically send to each recipient. An embodiment includes adaptively selecting a list of sub-users for receiving the second channel messages based on sensed action of sub-users that receive the second channel messages. Past actions of each of the sub-users can be used to adapt the list of sub-users to receive future second channel messages.

Selecting a Timing of Electronically Sending the Second Channel Electronic Messages As described, at least some embodiments include selecting 424 a send time of one or more of the second channel electronic messages. For an embodiment, multiple of the second channel electronic messages can be electronically sent to sub-users simultaneously. For example, a set of sub-users may be determined to be likely to respond to a particular type of second channel message. For an embodiment, the second channel messages may be sent to different sub-users at different times. For example, the sensing of action of recipients (sub-users) of the second channel messages can be used to adaptively adjust the timing of the sending of future second channel messages. For example, some sub-users may be adaptively determined to have performed an action based on receiving the second channel message versus some other sub-users. Accordingly, the timing of the second channel messages being sent may be adaptively adjusted based on the sensing of the actions of the recipient (sub-users) of the second channel messages. For an embodiment, a first second channel electronic message may be sent at a first time, and a second channel electronic message may be sent at a later time. The sequence of the timing of the sending of the first channel messages and the second channel messages may be used to determine which of the first channel or the second channel messages are more effective for each sub-user. Further, there can be situations in which one channel natural should user for first sending an electronic message.

Tuning the Prioritizing and Drafting of the Second Channel Electronic Messages

As described, at least some embodiments include sensing 428 sub-user action based on receiving the second channel electronic messages. The sensing may include sensing of any action performed by the recipient (sub-user) based on receiving the second channel electronic messages.

As described, at least some embodiments further include editing, by the server, the set of second channel electronic messages including fine tuning 426 the second channel electronic messages based on sensing actions of the recipients of the second channel electronic messages. For an embodiment, different versions of the second channel electronic messages are sent to different sub-user recipients. Based on the sensed actions of the sub-user recipients, certain versions are favored over other versions. That is, the versions that caused an action to be performed by the recipient sub-user can be categorized as more effective in causing action by the recipient. The different versions of the second channel electronic messages can be determined by the prioritization of text of the machine-encoded text based on at least a size and placement of the text of the formatted message, the drafting of the set of second channel electronic messages based on the prioritized text, and the electronically sending the set of second channel electronic messages to recipients.

For an embodiment, tuning the second channel electronic messages includes adaptively adjusting the prioritizing of the text of the machine-encoded text based on sensing the actions of the recipients of the second channel electronic messages. That is, the prioritizing can be improved by monitoring the actions of the sub-users in response to receiving the second channel electronic messages. The prioritizing process that yields the best (most likely to cause an action of the recipient sub-user) can be favored and used a majority of the time.

For an embodiment, fine tuning the second channel electronic messages includes adaptively adjusting send times of one or more of the second channel electronic messages based on the sensing the actions of the recipients of the second channel electronic messages. That is, the send times can be improved by monitoring the actions of the sub-users in response to receiving the second channel electronic messages. The send time selections that yield the best (most likely to cause an action of the recipient sub-user) can be favored and used a majority of the time.

For an embodiment fine tuning the second channel electronic messages includes adaptively adjusting the recipients of the second channel electronic messages based on the sensing the actions of the recipients of the second channel electronic messages. That is, different recipients can be selected for different of the second channel electronic messages. A list of sub-user recipients can be tuned for each of the first channel messages, and each of different types of second channel messages based on the monitored actions of the sub-user recipients. For each of the first channel messages and each of the different types of second channel messages, the list of sub-user recipients for each can be adaptively adjusted based on the sensed actions of the recipient sub-users. For an embodiment, fine tuning the second channel electronic messages includes adaptively adjusting a distribution of first channel messages and second channel messages amongst the sub-users. As previously described, some recipients (sub-users) will be more likely to perform an action based on receiving the first channel electronic messages, and some recipients will be more likely to perform an action based on receiving the second channel electronic messages. The sensing of the actions of the recipients can be used to select the distribution of the first and second channel electronic messages.

Over time, the actions of the recipients are learned, and what variation of the different types of electronic messages work the best is learned. For an embodiment, this can further include tuning to identify the importance of the text of the messages, and how to condense the text, and how to draft the second channel electronic messages.

Figure 5:
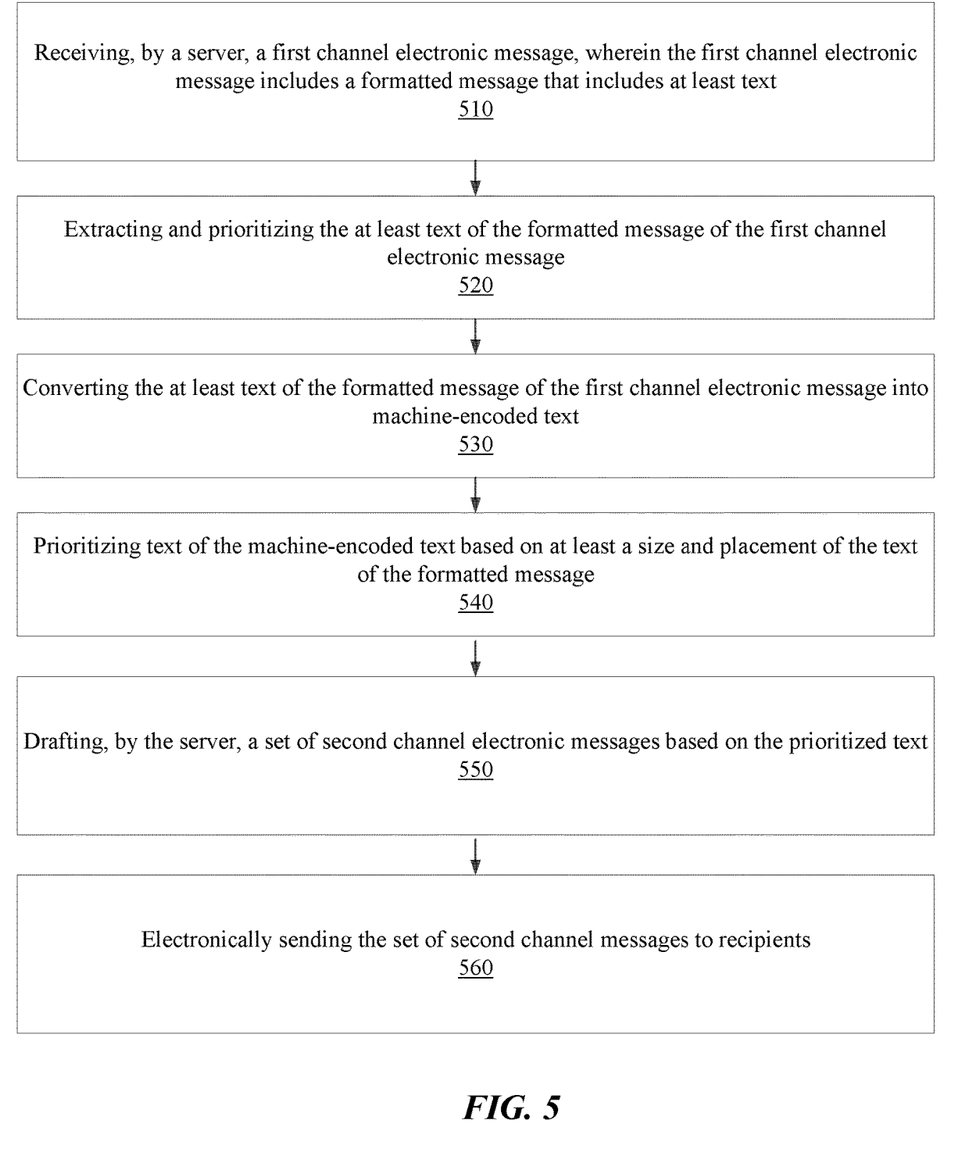
FIG. 5 is a flow chart that includes steps of a method for transforming a first channel electronic message to a second channel electronic message, according to an embodiment.

FIG. 5 is a flow chart that includes steps of a method for transforming a first channel electronic message to a second channel electronic message, according to an embodiment. A first step 510 includes receiving, by a server, a first channel electronic message, wherein the first channel electronic message includes a formatted message that includes at least text. A second step 520 includes extracting and prioritizing the at least text of the formatted message of the first channel electronic message. For an embodiment, the second step 520 includes a third step 530 of converting the at least text of the formatted message of the first channel electronic message into machine-encoded text, and a fourth step 540 of prioritizing text of the machine-encoded text based on at least a size and placement of the text of the formatted message. A fifth step 550 includes drafting, by the server, a set of second channel electronic messages based on the prioritized text. A sixth step 560 includes electronically sending the set of second channel electronic messages to recipients.

For an embodiment, the first channel message is received by the server from a user that may be, for example, a merchant. Once the second channel message has been generated, the second channel message is electronically sent to sub-users (recipients). For an embodiment, the sub-users are customers of the user (merchant).

Formatted Message

For an embodiment, the formatted message is a message that includes more than text, and the transforming of the first channel electronic message to the second channel electronic message includes more than a text-to-text transformation. For an embodiment, the formatted message further includes text with different sizes/colors/fonts, laid out a certain way, with images, animations/motion, and/or different behavior for different customers. The other non-text factors make a big difference in what the message is "saying" or trying to convey to recipients.

For an embodiment, converting the at least text of the formatted message of the first channel electronic message into machine-encoded text includes extracting text from the formatted message including size and formatting of the extracted text, extracting alt text from html image tags of the formatted message, and generating the machine-encoded text from the extracted text and the alt text. For an embodiment, the extracting of the text includes identifying size, location, and or formatting (i.e. is the text bolded, colored, underlined, etc.).

An embodiment includes extracting "alt text" from html image tags which is specific to email html representation. For an embodiment, this includes ignoring text from html items that are unlikely to be relevant to the core message of the email. (For example, a header/link bar at the top of the email). An embodiment includes eliminating text that is greater than a threshold amount (the threshold may be adaptively adjusted based on sub-user or user actions resulting from reception of the first or second channel messages) from the top of the email (first channel electronic message). For an embodiment, alt text (alternative text) describes the appearance or function of an image on a page. For example, alt text can be read aloud by screen readers used by visually impaired users, and displayed in place of an image if the image fails to load and is indexed by search engine bots to better understand the content of your page.

For an embodiment, converting the at least text of the formatted message of the first channel electronic message into machine-encoded text includes rendering an image from the formatted message, and generating a screenshot of the image wherein the at least text of the formatted message is converted to the machine-encoded message from the screen shot of the image by, for example, an OCR.

At least some of the described embodiments provide a visual summary of the first channel electronic message which may be, for example, an email. The visual summary is substantially more powerful than a mere summarizing of the text of the first channel electronic message. Further, the conversion of the text of the image to machine-encoded text (text extraction) accounts for text size (of the text of the image) and visual position (location of the text within the image). Further, at least some embodiments include condensing the machine-encoded text. That is, the first channel electronic message may include an email, and the second channel electronic message may include an SMS (short message system) message. Emails can contain multiple topics while SMS (or other short form channels) must be much more concise. Therefore, at least some embodiments include identifying the most relevant, important, and actionable text of the machine-encoded text to put in the second channel electronic message. For at least some embodiments, this includes extracting and prioritizing, and/or extracting and condensing the machine-encoded text.

For at least some embodiments, the most important of the machine-encoded text is identified based on the size of the text. For at least some embodiments, the most important of the machine-encoded text is identified based on the position or location of the text within the image. For at least some embodiments, a single core topic of the first channel electronic message (email) is extracted. That is, many emails contain multiple topics, while the shorter length of an SMS can only fit one. At least some embodiments include identifying key phrases from the email to be used in the SMS.

For at least some embodiments, the visual layout of the text within the image is used to identify the importance of the text within the image. For example, for an embodiment, the largest text and/or the text highest up (closest to the top of the image) are identified as the most important text of the image. At least some embodiment included identifying introductory catch phrase (usually the subject line of the email/preview text), key details about the promotion or product on offer (percent off, offer deadline, promo code, product details), and/or a call to action phrase that is most relevant to the message ("buy now", "click here", "shop our delicious salmon" etc.), which can be used to prioritize the text of the image.

As described, at least some embodiments further include selecting a send time of one or more of the second channel electronic messages. For example, the second channel electronic messages may be SMS messages which may be a more invasive channel, and accordingly avoid sending at night. For an embodiment, the second channel electronic message is sent as a follow up (sent after) a first channel message. That is, if the second message is a follow up on the first, send the second channel message later. For an embodiment, the send times are dependent on the local time zone of the recipient. Accordingly, different recipients in a common time zone may receive the second channel messages at the same time. For an embodiment, different second channel electronic messages are sent at different times so that the send times can be used to electronically test what the best time to send the second channel electronic messages.

As previously described, at least some embodiments include selecting a send time of one or more of the second channel electronic messages. For an embodiment, multiple of the second channel electronic messages can be electronically sent to sub-users simultaneously. For example, a set of sub-users may be determined to be likely to respond to a particular type of second channel message. For an embodiment, the second channel messages may be sent to different sub-users at different times. For example, the sensing of action of recipients (sub-users) of the second channel messages can be used to adaptively adjust the timing of the sending of future second channel messages. For example, some sub-users may be adaptively determined to have perform an action based on receiving the second channel message than some other sub-users. Accordingly, the timing of the second channel messages being sent may be adaptively adjusted based on the sensing of the actions of the recipient (sub-users) of the second channel messages. For an embodiment, a first second channel electronic message may be sent at a first time, and a second channel electronic message may be sent at a later time. The sequence of the timing of the sending of the first channel messages and the second channel messages may be used to determine which of the first channel or the second channel messages or more effective for each sub-user.

As described, for at least some embodiments the image of the first channel electronic message further includes a layout, wherein the layout indicates where the at least text of the image is located within the image, wherein a level of importance of the at least text of the image is determined by the location of the at least text in the image. For an embodiment, text located closer to the top of the image is determined to be more important than text located lower. That is, text located above the fold is considered more important than text located below.

For at least some embodiments the layout further includes a size of the at least text of the image, and wherein the level of importance is additionally determined based on the size of the at least text of the image. Other factors that can be used to evaluate the importance of the text include identifying preview text which can be identified as few lines of text, usually displayed in an email after the subject line. Further, at least some embodiments include using a text format to determine the importance of text. For example, if the text is red or bolded, it's probably more important. For an embodiment, text describing the image may be used to evaluate importance. For example, images, such as an emoji, may be used to evaluate the importance of associated text.

For an embodiment, an HTML parser library is used to extract the text. Further, for an embodiment, the HTML parser library further operates to extract text size and location. For an embodiment, an OCR algorithm is configured to determine coordinates of a box that includes the text.

For an embodiment, the text of the machine-encoded text is further prioritized based on a position of the at least text within the image. As described, a position higher up in the message may be prioritized as more important.

As previously described, at least some embodiments include condensing the machine-encoded text. At least some embodiments include condensing details of at least a word string or phrase of the prioritized text. For an embodiment, condensing the details include identifying at least one word string or phrase, an introductory catch phrase, key details of the promotion (percent off, offer deadline, promo code, product details), a single call to action phrase (ex. "Buy now"). For an embodiment, condensing comprises filtering/eliminating text of the at least text that is not associated with the identified word string or phrase. For an embodiment, the identified word string or phase is identified from a subject line of the first channel electronic message. For an embodiment, filtering the at least text includes filtering text of the machine-encoded text that is not similar to the text of the subject line. For an embodiment, higher-priority text is kept, and lower-priority text is filtered out. As described, the priority of the text can be determined by a similarity of the text with the subject line. For an embodiment, the priority is additionally or alternatively based on a spatial location of the text within the first channel electronic message. For an embodiment, the priority is additionally or alternatively based on size of the text within the first channel electronic message. For an embodiment, the filtering is based on prioritization of the text including identifying key parts of the text of the first channel electronic message. Such parts can be extracted, such as, an introduction, call to action phrase ("click here", "shop t shirts"), and/or 1-3 supporting details ("sale ends friday", "10% off shirts").

As previously described, for an embodiment, converting the at least text of the image of the first channel electronic message into machine-encoded text includes applying an OCR to convert the text of the image into the machine-encoded text.

For an embodiment, the extracted text is entered into a text generation model (for example, an LLM (large language model) which generates one or more second channel electronic messages. For an embodiment, prioritizing includes entering the importance of different portions of the extracted text based on the size and placement of the text within the first channel electronic message. Further, for an embodiment, the text generation model is directed to adhere to marketing best practices like being concise, friendly, having a clear call to action, etc. For an embodiment, the sensed sub-user (recipient) actions and sensed user actions are tracked and used to train the text generation model. Further, examples of well-written messages are used to help guide (train) the text generation model to generate second channel messages that look better or are more effective.

At least some embodiments include editing, by the server, the set of second channel electronic messages includes fine tuning the second channel electronic messages based on sensing actions of the recipients of the second channel electronic messages.

For an embodiment, the tuning includes adjusting the priority of different text conditions, such as, text placement, text size, text color, text intensity. For an embodiment, the tuning is adaptively adjusted based on the sensed action of the recipient (sub-users) of the second channel electronic messages. That is, second channel electronic messages can be electronically sent to the sub-users wherein the different text conditions are adjusted between the different second channel electronic messages. The sensed actions of the recipients can be used to tune the priorities of each of the different text conditions. That is, each of the different text conditions can have a priority that is selected based on the sensed recipient (sub-user) actions in response to receiving the different second channel electronic messages having the different adjusted text conditions.

For an embodiment, the fine tuning of the second channel electronic messages includes adaptively adjusting send times of one or more of the second channel electronic messages based on the sensing the actions of the recipients of the second channel electronic messages. For an embodiment, fine tuning the second channel electronic messages includes adaptively adjusting send times of one or more of the second channel electronic messages based on the sensing the actions of the recipients (sub-users) of the second channel electronic messages. That is, the send times can be improved by monitoring the actions of the sub-users in response to receiving the second channel electronic messages. The send time selections that yield the best (most likely to cause an action of the recipient sub-user) can be favored and used a majority of the time. As described, at least some embodiments further include selecting a send time of one or more of the second channel electronic messages. For example, the second channel electronic messages may be SMS messages which may be a more invasive channel, and accordingly avoid sending at night. For an embodiment, the second channel electronic message is sent as a follow up (sent after) a first channel message. That is, if the second channel message is a follow up on the first, send the second channel message later. For an embodiment, the send times are dependent on the local time zone of the recipient. Accordingly, different recipients in a common time zone may receive the second channel messages at the same time. For an embodiment, different second channel electronic messages are sent at different times so that the send times can be used to electronically test what the best time to send the second channel electronic messages.

For an embodiment, the fine tuning of the second channel electronic messages includes adaptively adjusting the recipients of the second channel electronic messages based on the sensing the actions of the recipients of the second channel electronic messages. For an embodiment, an active list of recipients is adaptively adjusted based on the sensed action of the recipients. For an embodiment, lower performing recipients are dropped, and higher performing recipients are maintained. Over time, the recipient list(s) includes only high performers. For an embodiment, different recipients can be selected for different of the second channel electronic messages. A list of sub-user recipients can be tuned for each of the first channel messages, and each of different types of second channel messages based on the monitored actions of the sub-user recipients. For each of the first channel messages and each of the different types of second channel messages, the list of sub-user recipients for each can be adaptively adjusted based on the sensed actions of the recipient sub-users. For an embodiment, fine tuning the second channel electronic messages includes adaptively adjusting a distribution of first channel messages and second channel messages amongst the sub-users. As previously described, some recipients (sub-users) will be more likely to perform an action based on receiving the first channel electronic messages, and some recipients will be more likely to perform an action based on receiving the second channel electronic messages. The sensing of the actions of the recipients can be used to select the distribution of the first and second channel electronic messages.

An embodiment further includes managing, by the server, the set of second channel electronic messages includes fine tuning the second channel electronic messages based on sensing actions of a user in response to the second channel electronic messages. As previously described, for an embodiment, the server 101 that is connected through an electronic network 114 to at least a user server 140 of the user. For an embodiment, the user server 140 manages a merchant website of the user. Further, as described, the server 101 receives 111 from the user server 140 the first channel electronic message, wherein the first channel electronic message includes a formatted message that includes at least text. For an embodiment, the user can review the second channel messages before the second channel messages are electronically sent to the sub-users. During this review, the user can edit or modify the second channel messages before being sent to the sub-users. These actions during the review of the second channel messages can be used to adaptively adjust future second channel messages based on monitoring the actions of the user.

Tracking Sub-User (Second Channel Recipient) Actions

As previously described, for an embodiment, the server 101 further operates to electronically send 122 the set of second channel electronic messages to computing devices 104, 106 of sub-users 108, 112. For an embodiment, the computing devices 104, 106 of the sub-users 108, 112 are electronically connected to the server 101 and the user server 140 through, for example, the network 114. For an embodiment, the server 101 tracks sub-user actions based on the messages (first channel messages and/or second channel messages) displayed to one or more sub-users 108, 112

(which may be customers) of the user (which may be a merchant) of the user server 140.

For an embodiment, when the sub-user loads a webpage, user-tracking code is loaded in through a JavaScript bundle and utilized within the browser of the sub-user. For an embodiment, actions of the sub-user on the website of the user can be tracked. Further, a mobile device of a sub-user can be tracked to determine other possible actions of the sub-user. For an embodiment, forms that have been filled out and submitted to the website of the user can be monitored and tracked. For an embodiment, behavior of the sub-user's internet browser or device (that would affect communication of a message or a sub-user's desired action) can be monitored or tracked. For an embodiment, navigation by the sub-user to a website or URL (universal resource locator) can be sensed, tracked, and monitored.

For an embodiment, the user-tracking code can utilize sensors on the computing device of the sub-user to track actions of the computing device. For example, the computing device may be a mobile device that includes motion and location sensors that can identify actions of the sub-user that can be correlated with the sub-user having received a displayed form. Further, actions of multiple sub-users can be sensed to determine correlations between different sub-users.

For an embodiment, the tracking of the sub-users includes tracking online activity and action by the sub-users. For an embodiment, a sub-user device (such as, devices 104, 106) alone or in conjunction with the server 101, or the user server 140 operates to sense the sub-user action data. For an embodiment, the sensed and tracked sub-user action data includes the sub-user computing device electronically sensing a sub-user performing an action or activity in response to the displaying of the first channel or second channel messages to the sub-user. For an embodiment, sensing the sub-user performing an action includes sensing that the sub-user is selecting or "clicking" a link included within the generated first or second channel message(s).

While the described embodiments are directed towards sensing sub-user action data, it is to be understood that at least some other embodiments can additionally or alternatively include the sensing of other types of data as well. For an embodiment, the sensed data can include user server data, such as, web traffic and purchases among message recipients. That is, the sensed sub-user action data could be replaced with, for example, data of daily total or new visitors on the user website.

The sub-user action data may be tracked (counted) over various possible time periods (such as, by the second, minute, hour, day, week, or month) and may include one or more of sub-users (108, 112) being active on the website of the user server 140, a sent email bouncing, a sub-user canceled order, a sub-user starting a checkout, a sub-user clicking (selecting) an email, a sub-user opening email, a sub-user placing order, a sub-user receiving email, a sub-user refunding an order, a sub-user unsubscribing, a sub-user viewing a product, a sub-user adding to a list (a list in the marketing automation platform of the server 101 account), and/or a sub-user adding an item to their cart.

It is to be understood, however, that there are very few limitations on what event types (sub-user actions) can be published (provided) to an automation platform of the server 101. Website managers (such as website manager of the user server 140) can implement their own events (sensed sub-user actions) that make sense for their business and simply send those events over to the automation platform of the server 101.

Further, as will be described, implementations of computing devices 104, 106 that include mobile devices can additionally or alternatively include additional types of sensed sub-user actions. Such sensed sub-user action can include sensing a physical sub-user visit and/or purchase. Further, such sensed sub-user action can include sensing a virtual sub-user visit and/or purchase online. That is, the sensing of the sub-user action can include sensing the sub-user visiting a physical location of the user (merchant), and/or the sub-user purchasing a product or service of the user at a physical store location of the user. Further, the sensed sub-user actions can include combinations or sequences of sub-user actions. For an embodiment, sensed sub-user actions are weighted based on the sensed sub-user actions. For an embodiment, only sensed sub-user actions having a weight, or a combination of weights that exceed a sub-user action threshold are considered a sub-user action for the purposes of detecting sub-user actions.

For an embodiment, the location monitoring of the mobile device of the sub-user is used to identify business locations visited by the recipient after receiving the second channel message(s) of the marketing message. Different businesses can be rated, wherein particular businesses yield a higher sub-user action score, and other particular businesses yield a lower engagement score. The sub-user action score of each business can be adaptively adjusted based on the electronic marketing message of the user and can be adjusted based on other businesses visited by the recipient. For an embodiment, patterns of location visits by the recipient can be used to influence the level of sub-user action.

For an embodiment, motion of the recipient is tracked by location and motion sensors 409 and can be used to influence the level of sub-user action. Certain actions (motions) of the recipient may indicate different levels of sub-user action. For an embodiment, the computing devices 104, 106 may include a mobile phone, a smart watch, or a headset. Motion of the recipient can include tracking hand motions, direction of eyesight, and/or orientations of the recipient. Accordingly, whether the recipient is in a physical location of a product of the user can be determined. Further, how long the recipient holds or looks at a specific product of the user can be determined. Further, whether the recipient interacts with another recipient can be determined. All the sensed/tracked locations and motions of the sub-user can be included within a score of the sub-user action. For example, visiting a restaurant after receiving a message is a very possible use case since this is an in-person sub-user action. Again, a score that exceeds a score threshold can be deemed a sub-user action. The actions and locations of the sub-user can be tracked 407 allowing patterns in the sub-user behavior to be determined. As described, sequences of behaviors by the sub-user can be ranked for determining a score which is used for determining whether a sub-user action has occurred.

Further, for an embodiment, different businesses physically visited can be rated, wherein particular businesses yield a higher success score and other particular businesses yield a lower success score. The success score of each business can be adaptively adjusted based on marketing messages and can be adjusted based on other businesses visited by the sub-user. For an embodiment, patterns of location visits by the sub-user can be used to influence the level of success. That is, for example, visiting a location of a business can be rated higher or lower based on a previous business visited by the sub-user.

As previously described, the sub-user tracking can include monitoring of web browsing of the sub-user. Online action and activity of the sub-user can influence the success score. Links accessed by the sub-user can be tracked. Websites visited by the sub-user can be tracked. Online purchases of the sub-user can be tracked. Each of the online web browsing of the sub-user can influence the success score of the sub-user actions.

For an embodiment, eye tracking of a sub-user can be sensed and used to see how long a sub-user observes a second channel message (how engaging the message is), or, how long the sub-user has the second channel open on their screen. These observed actions can further be used to rank the success of second channel electronic messages sent to sub-user(s).

For an embodiment, relationships between different sub-users are determined. For example, web tracking can determine online relationships between sub-users. Further, for an embodiment, a real physical relationship between sub-users can be established by tracking the locations of the different sub-users. Two sub-users may be identified as friends or associates or living together based on location tracking. Further, commonalities of recipients can be determined by identifying common locations, or common types of locations between the different sub-users. The influence one sub-user has on another sub-user can be measured and the influence can add or subtract from the success score.

For an embodiment, a level of sub-user action can be adaptively adjusted for each sub-user based on actions of an associated sub-user. An action by a related or common type of sub-user can influence how much an action by a sub-user influences the engagement determination or influences a success determination.

As previously described, the success determination of the described sub-user actions can be scored, and a score exceeding a score threshold can qualify as a sub-user action which is tracked.

The sub-user may then act upon the receiving and displaying of the first channel or second channel message(s). For an embodiment, the sub-user actions based on the displayed second channel message are monitored. For an embodiment, the sub-user actions are stored in the action database. For an embodiment, a second discriminator model of the server 101 generates a quality rating for each of the displayed second channel messages based on the previously described different sub-user actions. For an embodiment, the quality rating of each of the second channel messages is feedback to the server 101 to additionally influence the generation of second channel messages.

Tracking User Actions

As previously described for an embodiment, the user can review the second channel messages before the second channel messages are electronically sent to the sub-users. During this review, the user can edit or modify the second channel messages before being sent to the sub-users. These actions during the review of the second channel messages can be used to adaptively adjust future second channel messages based on monitoring the actions of the user. For an embodiment, the server 101 additionally tracks user (merchant) actions based on the second channel messages displayed to the user (merchant) of the user server 140. For at least some embodiments, the tracking of the user (merchant) actions includes tracking the user selecting a displayed second channel message of a plurality of displayed second channel messages. Clicking the displayed second channel electronic message indicates an interest by the user in the selected second channel message and indicates a level of value of the selected second channel message. For an embodiment, tracking of the user includes tracking the user modifying the second channel message, and submitting a final revised second channel message. For an embodiment, tracking of the user includes identifying differences between the second channel messages displayed to the user and the second channel message(s) sent by the user to sub-users of the user. Modifying a selected second channel message provides a level of value of the modified and submitted second channel message. For an embodiment, tracking of the user includes tracking future user copy (merchant copy is content written to promote or sell a product or service or to persuade readers to take a certain action. Marketing (merchant) copy is a useful tool that educates customers, provides resources and details contact information to help businesses increase awareness of their products and services) to identify if any of the electronic messages were used as tonal or stylistic inspiration in future communications. For an embodiment, tracking of the user actions includes tracking the user interacting with the second channel message generation system to allow more creative copy from users regardless of whether specific verbatim phrases are used in future communications. For an embodiment, tracking the actions of the user includes tracking messages sent by the user in any channel supported by the system including, for example, email, SMS, send push notifications, and others.

For an embodiment, a discriminator model operates to assign a quality rating for each of the second channel messages based on the identified (tracked) user actions. For an embodiment, the discriminator model is provided with examples of second channel messages and whether or not a user clicked on, engaged with, or is inspired from (such as writing copy that is similar to), or performed some other action showing interest in a generated second channel message. This allows the discriminator model to predict whether or not a user will find a second channel message that the generator comes up with to be of high-quality and based on the discriminator's predicted probability that the merchant will approve the second channel message, the X short second channel messages with the highest X "quality ratings" can be chosen and then those X second channel messages can be shown to the user since they're the second channel messages can also be used by the discriminator model.

For an embodiment, different tracked user actions suggest a different level of quality of each of the second channel messages. Accordingly, different specific actions, and/or combinations of actions performed by the user on the displayed second channel messages can yield a different ranking of the second channel messages.

For an embodiment, the discriminator model is trained on historically tracked user actions on previously generated second channel messages, wherein the historical user actions include selection, editing, and actual use of a second channel message. For an embodiment, the trained historical model is equipped to assign a quality rating to new, previously unseen second channel messages after the second channel messages have been generated, allowing selection of the predicted top-performing second channel messages to display to the user.

An embodiment further includes continuously updating the generative text engine model based on continuously tracked user and sub-user actions.

For an embodiment, enhancing the content includes personalizing the content for the specific users. For an embodiment, the branding voice of the user is determined by analyzing previous or past samples of messages or other content of the user. For an embodiment, users provide the server with a url of a storefront website of the user, so that the server can scrape certain parts of the website of the user and use this information to adapt the style of generated messages. An embodiment includes classifying companies (users) as different things (for example, fun, serious, etc.), and then using the classifications to tag companies (users) based on a communication style, in which the communication style is based on analysis done on prior communications (short messages and/or other communications by the user) sent by that user. For an embodiment, the branding voice of the user provides a high-level description of an overall communication style of a company (user). The branding voice can include a linguistic style, personality, use of emojis, punctuation, and/or common phrases to personalize the second channel messages to mirror a specific brand tone of the user.

For an embodiment, tracking the actions of the user includes tracking one or more second messages in their final form before being sent to sub-user(s). Differences between the final form and the form as suggested by the second channel messages can be identified and used for future short message generation.

For an embodiment, enhancing the content includes controlling a message length, such as, shortening or lengthening a selected piece of the electronic messages. As previously described, for an embodiment, a user is provided with a slider control that allows the user to adaptively adjust the tone of the electronic messages. For example, the slider is displayed on a user interface to the user, wherein the user can adjust the slider control to adjust the tone. For example, the endpoints of the slider control may be serious and fun, and the user adjusts the slider control between the two endpoints to control the tone of the electronic messages between serious and fun. For an embodiment, enhancing the content includes providing the user with a toggle that allows the user to selectively match a brand voice of current electronic messages with a brand voice of past electronic messages.

For an embodiment, enhancing the existing content is based on collected information from second channel messages of past high-performing electronic marketing messages and adjusting content of the selected one or more of the second channel messages to reflect a brand tone of the user based on content and success of past high-performing electronic marketing messages and existing website content. For an embodiment, the brand tone includes a tone signature. That is, a mood the user typically expresses in their electronic communications The mood can be mathematically expressed, for example, by determining whether the communications of the user typically fall on a couple mood dimensions, such as, fun vs. serious, sincere vs. snarky, engaging vs. boring. The mood may alternatively or additionally be determined based on common emojis/phrases/keywords that often occur in messages of the user. The mood may alternatively or additionally be determined based on message length, use of emojis, and other media (e.g. pictures, links).

For an embodiment, as previously described, the brand tone or mood of a user can be determined by evaluating a sample of a copy of the user. For an embodiment, a tone of a user is estimated based on evaluating past messages of the user and selecting which previous messages to copy tone from based on the performance of the previous message when sent to sub-users of the user. Common tactics include determining whether the previous messages evoke curiosity, convey urgency, and/or create rapport with the sub-users of the user.

Although specific embodiments have been described and illustrated, the embodiments are not to be limited to the specific forms or arrangements of parts so described and illustrated. The described embodiments are to only be limited by the claims.

What is claimed:

1. A method of transforming a message of a first channel to a message of a second channel, comprising:
    receiving, by a server, a first channel electronic message, wherein the first channel electronic message includes a formatted message that includes at least text;
    extracting and prioritizing the at least text of the formatted message of the first channel electronic message, comprising:
        converting the at least text of the formatted message of the first channel electronic message into machine-encoded text comprising
            extracting text from the formatted message including size and formatting of the extracted text;
            extracting alt text from html image tags of the formatted message;
            generating the machine-encoded text from the extracted text and the alt text;
        prioritizing text of the machine-encoded text based on at least a size and placement of the text of the formatted message;
    drafting, by the server, a set of second channel electronic messages based on the prioritized text; and
    electronically sending the set of second channel electronic messages to recipients.

2. The method of claim 1, further comprising selecting a send time of one or more of the second channel electronic messages.

3. The method of claim 1, wherein the formatted message of the first channel electronic message further includes a layout, wherein the layout indicates where the at least text of the formatted message is located within the formatted message, wherein a level of importance of the at least text of the formatted message is determined by the location of the at least text in the formatted message.

4. The method of claim 3, wherein the layout further includes a size of the at least text of the formatted message, and wherein the level of importance is additionally determined based on the size of the at least text of the formatted message.

5. The method of claim 1, further comprising condensing details of at least a word string or phrase of the prioritized text.

6. The method of claim 5, wherein condensing the details comprises identifying at least one word string or phrase, an introductory catch phrase, key details of the promotion, or a single call.

7. The method of claim 5, wherein condensing the details comprises eliminating text of the at least text that is not associated with the identified word string or phrase.

8. The method of claim 1, further comprising managing, by the server, the set of second channel electronic messages comprising fine tuning the second channel electronic messages based on sensing actions of the recipients of the second channel electronic messages.

9. The method of claim 8, wherein fine tuning of the second channel electronic messages comprises adaptively adjusting the prioritizing of the text of the machine-encoded text based on the sensing the actions of the recipients of the second channel electronic messages.

10. The method of claim 8, wherein fine tuning of the second channel electronic messages comprises adaptively adjusting send times of one or more of the second channel electronic messages based on the sensing the actions of the recipients of the second channel electronic messages.

11. The method of claim 8, wherein fine tuning of the second channel electronic messages comprises adaptively adjusting the recipients of the second channel electronic messages based on the sensing the actions of the recipients of the second channel electronic messages.

12. The method of claim 1, further comprising managing, by the server, the set of second channel electronic messages comprising fine tuning the second channel electronic messages based on sensing actions of a user in response to the second channel electronic messages.

13. A system for transforming a message of a first channel to a message of a second channel, comprising:
  a user server;
  a server electronically connected to the user server through a network, the server configured to:
    receive a first channel electronic message, wherein the first channel electronic message includes a formatted message that includes at least text;
    extract and prioritize the at least text of the formatted message of the first channel electronic message, comprising:
      converting the at least text of the formatted message of the first channel electronic message into machine-encoded text comprising
      extracting text from the formatted message including size and formatting of the extracted text;
      extracting alt text from html image tags of the formatted message;
      generating the machine-encoded text from the extracted text and the alt text;
      prioritizing text of the machine-encoded text based on at least a size and placement of the text of the formatted message;
  wherein the server is further configured to:
    draft a set of second channel electronic messages based on the prioritized text; and
    electronically send the set of second channel electronic messages to recipients.

14. The system of claim 13, wherein the server is further configured to manage the set of second channel electronic messages comprising fine tuning the second channel electronic messages based on sensing actions of the recipients of the second channel electronic messages.

15. The system of claim 13, wherein the server is further configured to manage the set of second channel electronic messages comprising fine tuning the second channel electronic messages based on sensing actions of a user in response to the second channel electronic messages.

16. The system of claim 14, wherein fine tuning the second channel electronic messages comprises adaptively adjusting the prioritizing of the text of the machine-encoded text based on the sensing the actions of the recipients of the second channel electronic messages.

* * * * *